April 7, 1936.
M. E. REAGAN
2,036,298
CONTACT MAKING DEMAND METER
Filed Jan. 2, 1935
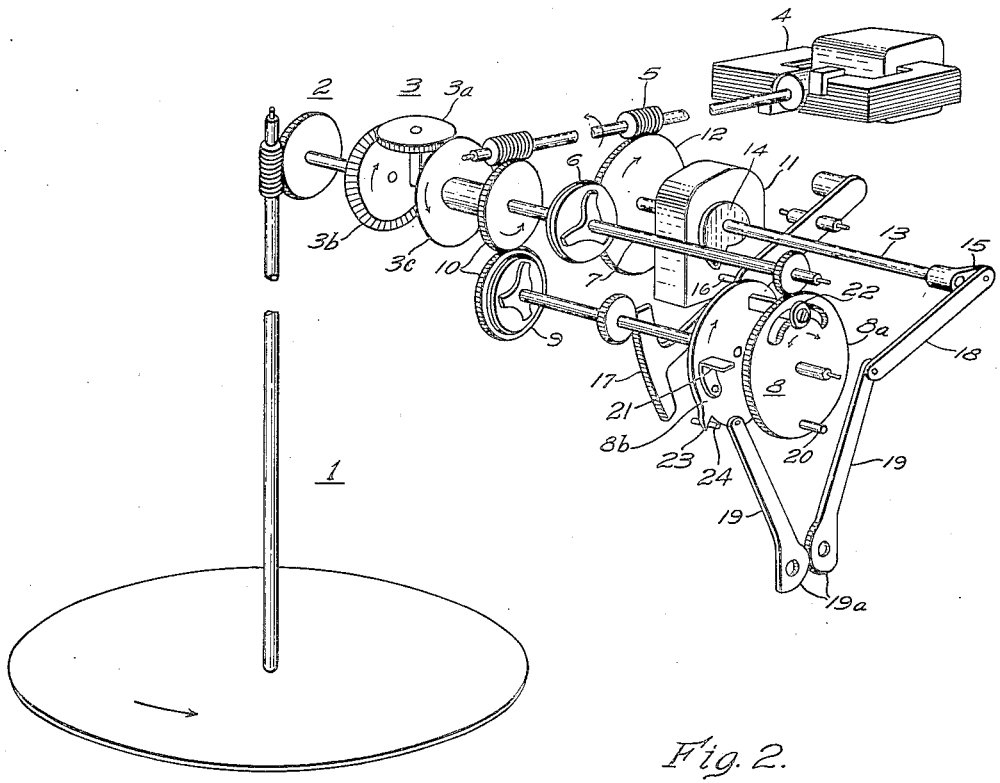
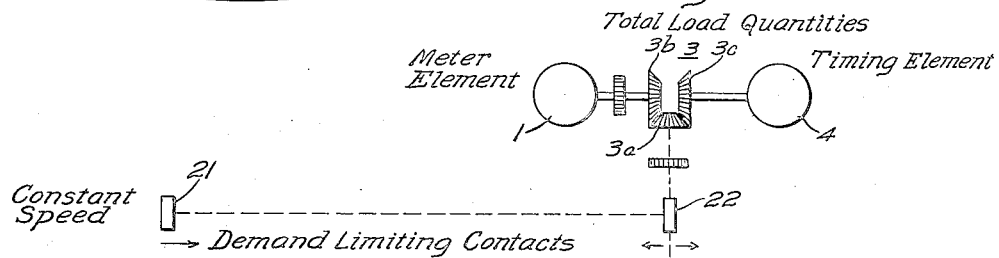
WITNESSES:
C. J. Weller.
Geo. O. Harrison
INVENTOR
Maurice E. Reagan.
BY
ATTORNEY Patented Apr. 7, 1936

2,036,298

UNITED STATES PATENT OFFICE 2,036,298

CONTACT-MAKING DEMAND METER

Maurice E. Reagan, Forest Hills, Pa., assignor to Westinghouse Electric & Manufacturing Company, East Pittsburgh, Pa., a corporation of Pennsylvania Application January 2, 1935, Serial No. 61

7 Claims. (Cl. 171—34)

My invention relates to contact-making demand meters and particularly to such meters of the block interval type. More specifically, my invention relates to demand meters of the type provided with load-limiting contacts for commutating a signal or control circuit when the demand averaged through a demand interval, approaches a variable limit determined by the integrated energy necessary to supply a base load during the remainder of the demand interval.

In such meters as heretofore constructed, a load contact is driven at a rate proportional to the load toward a limiting contact which is driven in the same direction at a rate corresponding to the value of base load on which continuity is to be maintained. The load contact overtakes the limit contact only in the event that the total energy consumption from the start of the demand period is so high that the integrated energy required for the base load during the remainder of the period can barely be supplied without overrunning the demand limit. In this way the full limit of demand may be used during peak loads without risking interruption of the base load.

The above-described meter is satisfactory for many applications but is subject to the disadvantage that excess quantities, such as the integrated excess of the actual load above a predetermined value cannot be measured without separate excess meters. The measurement of excess quantities may be necessary as a basis for an excess charge, or for information in connection with load studies.

It is an object of my invention to provide a novel meter mechanism of the general type indicated above which may be utilized for the measurement of total load quantities, such as energy and maximum demand, and which may also be utilized for the measurement of excess quantities where such measurements are necessary.

Another object of my invention is to provide a novel meter mechanism of the type indicated above which may be used to measure excess quantities above a predetermined value, where such value is different from the value of base load upon which continuity of power supply is to be maintained.

Other objects of my invention will become evident from the following detailed description taken in conjunction with the accompanying drawing, in which Figure 1 is a diagrammatic view in perspective of a contact-making demand meter embodying my invention; and, Fig. 2 is a diagrammatic view illustrating the operation of the principal operating parts of the mechanism shown in Fig. 1.

Referring to Fig. 1, in detail, a meter driving element 1 is connected by means of gearing 2 to one element 3b of a differential gear 3. A constant speed timer 4 is similarly connected by means of gearing 10 to a second element 3c of the different gear 3.

The meter element 1 may be a primary element energized directly in accordance with a load variable such as current or power, or may be a secondary element operated by means of electrical impulses in a manner well understood in the art. The timer 4 may be of any suitable mechanical or electrical type and is illustrated as a synchronous-type timing motor.

The differential gear 3 is provided with a planetary element 3a, connected by means of a slip-friction clutch 6 to a shaft 7 which is arranged to drive one part 8a of a contact device 8. A second part 8b of the contact device 8 is connected by means of a slip friction clutch 9 and the gearing 10 to be driven at constant speed from the timer 4. It will be understood that the gearing shown is diagrammatic, and that suitable gear trains calculated in accordance with the usual engineering principles would, in practice, be inserted at various points in the mechanism.

A spring-motor resetting device 11, of the type usually provided in block-interval demand meters, is driven from the timer 4 by means of a gear 12, and is arranged to rotate a shaft 13 one complete revolution at the expiration of every demand period, which may be of usual duration such as 15 or 30 minutes. As the construction and operation of spring-motor resetting devices such as 11 are well known in the art, the device itself has been shown diagrammatically. The device 11 operates in the usual manner to hold the shaft 13 stationary during substantially one entire revolution of the gear 12, and then to release its stored mechanical energy in rotating the shaft 13 exactly one revolution.

A cam 14 and a crank 15 are rigidly secured to the shaft 13 for resetting the two parts 8a and 8b of the contact device 8 to their initial positions at the end of each demand period. The cam 14 engages a pin 16 secured to a resetting segment 17, of known construction, to reset the constant speed part 8b of the contact device 8.

The crank 15 is connected by means of an arm 18 to a pair of resetting levers 19, arranged, when moved together, to center a pin 20 secured to the variable speed part 8a of the contact device 8. The resetting levers 19 are geared together by means of segmental gear portions 19a. The part 8b of the contact device 8 is provided with a hooked portion 23 arranged to engage a stationary stop 24 when the part 8b is in its initial position at the beginning of a demand interval.

A spring contact 21 is secured to the part 8b of the contact device 8, and a cooperating contact 22 is adjustably secured to the part 8a. The contacts 21 and 22 and the resetting segment 17 are shown, in Fig. 1, in their initial positions at the beginning of a demand interval.

The gearing relationships in the meter may better be explained by reference to Fig. 2, in which the principal operating parts are shown more diagrammatically in connection with a linear development of the contact path. The timing element 4 tends to drive the contact 22 away from the contact 21 at a constant speed proportional to the value of load above which the excess is to be measured. The meter element 1 tends to drive the contact 22 toward the contact 21 at a speed proportional to the actual load. The timing contact 21 is driven toward the contact 22 at a constant speed proportional to the difference between the value of load above which the excess is to be measured and the value of base load upon which continuity is to be maintained. The distance separating the contacts 21 and 22 is such that with the timer 4 and timing contact 21 stationary, the load contact 22 would be driven into engagement with the contact 21 in exactly the demand interval (fifteen minutes, for example) if the meter element 1 were operated at a speed corresponding to maximum permissible demand. The gear ratios between the timer 4 and the contacts 21 and 22 are so related that with the meter element 1 stationary, the contacts 21 and 22 would both be driven to the right in the figure at such speeds that they would separate an amount proportional to the base load. For example, if the base load were 10% of the maximum permissible demand, the total separation between the contacts 21 and 22 which would occur during a complete demand interval with the meter element 1 stationary would be 10% of the initial distance separating them.

The operation of the apparatus shown in Fig. 2 may be set forth as follows: If the load energizing the meter element 1 exactly equals the base value upon which continuity is to be maintained, the contact 22 is driven to the right in the figure at the same speed as the contact 21. For all higher values of load, the contact 22 moves to the right at a slower rate or reverses and moves to the left. In either case the distance separating the contacts 21 and 22 diminishes.

The distance initially separating the contacts 21 and 22 corresponds to the total integrated load, above that necessary for the base load, which may be drawn during the demand interval without exceeding the permissible demand limit. If this distance is entirely taken up at any time during the demand interval, the base load may still be carried throughout the remainder of the interval without exceeding the demand limit. Upon engagement of contacts 21 and 22 a circuit (not shown) is completed for directly disconnecting part of the load or for signalling for a reduction of load.

It will be noted that the rate of separation of the contacts 21 and 22 brought about by the timing element 4 in this arrangement does not depend upon the speed of element 3c of the differential 3 alone, but also depends upon the speed of the contact 21. The speed of the planetary element of the differential gear 3, however, depends on the excess of the speed of the element 3b above that of the element 3c and is independent of the speed of contact 21. It is possible, accordingly, to meter the excess of load above a predetermined value different from the base load upon which continuity of supply is to be maintained.

The operation of the principal operating parts of the meter shown in Fig. 1 will be obvious from the above description of Fig. 2. The resetting mechanism of Fig. 1 operates as follows: Assuming that a demand interval has just started, the gear 12 rotates slowly storing energy in the resetting device 11 while the shaft 13 is held stationary. The gear wheel 12 completes one revolution at the expiration of the demand interval, and the stored energy in the resetting device 11 is then released in rotating the shaft 13 one revolution.

Upon revolution of the shaft 13, the cam 14 forces the pin 16 down to the position shown, thereby causing the segment 17 to rotate part 8b of the contact device to the position in which the hooked portion 23 engages the stop 24. This movement is not transmitted backward through the gearing 10 because of slipping of the clutch 9.

The rotation of shaft 13 also causes the crank 15 to force the resetting arms 19 into engagement with the pin 20 momentarily and then to restore them to their initial position. This operation centers the pin 20, and the shaft 7 rotates causing the clutch 6 to slip.

I do not intend that the present invention shall be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. In a demand limiting device, a movable member, means for displacing said member from an initial position an amount proportional to the integrated excess of a load variable above a predetermined value, means for periodically resetting said member to said initial position and contact means controlled by said member.

2. In a demand limiting device, a movable member, means for displacing said member from an initial position at a rate proportional to the excess of a load variable above a predetermined value, means for periodically resetting said member to said initial position and contact means controlled by said member.

3. In a demand limiting device, a pair of relatively movable circuit-controlling members and control means for said members effective to introduce a component of motion separating said members at a rate determined by the value of a base load, said control means including a meter element responsive to a load variable, a constant-speed timing element and differential means controlled by said meter element and said timing element for moving one of said members at a rate proportional to the excess of said load variable above a predetermined constant value.

4. In a demand limiting device, means for producing an effect proportional to a load variable, means for producing an opposing effect of constant magnitude, means for integrating the difference of said effects, and circuit-controlling means operable in response to a predetermined increase of the integrated value of said difference within a predetermined time interval.

5. In a demand limiting device, means for producing an effect proportional to a load variable, means for producing an opposing effect of constant magnitude, means for periodically integrating the difference of said effects throughout a demand interval, and circuit-controlling means responsive to a predetermined value of the integral of said difference.

6. In a demand limiting device, differential means having a first driving element, a second driving element and a third element differentially responsive to movements of said driving elements, a movable member controlled by said third element, a second movable member, contact means controlled by said movable members, means for moving said first driving element at a speed proportional to a load variable, and means for moving said second element and said second movable member at constant speeds.

7. In a demand limiting device of the block-interval type, differential means having a first driving element, a second driving element and a third element differentially responsive to movements of said driving elements, a first movable member controlled by said third element and operable from an initial position, a second movable member operable from an initial position into cooperative relationship with said first movable element, contact means controlled by said movable elements, means for moving said first driving element at a speed proportional to a load variable, means for moving said second element and said second movable member at constant speeds, and means for periodically resetting said movable members to said initial positions.

MAURICE E. REAGAN.